United States Patent [19]

Meyer

[11] Patent Number: 4,974,374

[45] Date of Patent: Dec. 4, 1990

[54] APPARATUS AND METHOD FOR MANUALLY SMOOTHING AND CLEANING CERAMIC ARTICLES

[76] Inventor: Josephine R. Meyer, 211 W. Harry, Goddard, Kans. 67052

[21] Appl. No.: 452,053

[22] Filed: Dec. 18, 1989

Related U.S. Application Data

[63] Continuation-in-part of Ser. No. 382,982, Jul. 21, 1989.

[51] Int. Cl.$^5$ .............................................. B24D 15/00
[52] U.S. Cl. ........................................ 51/392; 51/391; 51/393
[58] Field of Search .................. 51/391, 392, 393, 358, 51/382, 386, 394, 387, 383; 30/507, 513

[56] References Cited

U.S. PATENT DOCUMENTS

| | | | |
|---|---|---|---|
| D. 267,439 | 12/1982 | Gibson . | |
| D. 267,591 | 1/1983 | Gibson . | |
| 1,441,920 | 1/1926 | Gstalder . | |
| 1,660,351 | 2/1928 | Pataki . | |
| 1,718,909 | 1/1929 | Lange . | |
| 2,123,889 | 7/1938 | Gleason | 285/71 |
| 2,132,889 | 10/1988 | Ayres | 51/393 X |
| 2,332,307 | 10/1943 | Dennis | 30/116 |
| 2,446,653 | 8/1948 | Kelly | 51/126 |
| 2,447,327 | 8/1948 | Gerrits et al. | 51/186 |
| 2,526,418 | 10/1950 | Rees | 15/209 |
| 2,527,089 | 10/1950 | Adams | 51/187 |
| 2,529,434 | 11/1950 | Walker | 15/209 |
| 2,685,704 | 8/1954 | Haber | 15/209 |
| 3,046,590 | 7/1962 | Robertson | 15/209 |
| 3,874,126 | 4/1975 | Catlin et al. | 51/393 |
| 3,936,123 | 2/1976 | Leinberger | 339/29 B |
| 4,071,983 | 2/1978 | Thielen | 51/393 |
| 4,126,962 | 11/1978 | Polcaro | 47/1.5 |
| 4,314,426 | 2/1982 | Friend | 51/393 |
| 4,694,618 | 9/1987 | Eberhart | 51/392 |

FOREIGN PATENT DOCUMENTS 531505 2/1921 France .

Primary Examiner—Frederick R. Schmidt
Assistant Examiner—Bruce P. Watson
Attorney, Agent, or Firm—John Wade Carpenter

[57] ABSTRACT

An apparatus for manually smoothing and cleaning ceramic articles. The apparatus has a flexible body with a pair of springable legs. Each leg has a top portion, an intermediate portion, and a terminous portion having a structure defining a slot. Each intermediate portion optionally has a lug secured to an outside surface thereof. A flexible fastening device is secured to the lug or directly to the intermediate portion. A method for manually smoothing and cleaning ceramic articles.

18 Claims, 4 Drawing Sheets

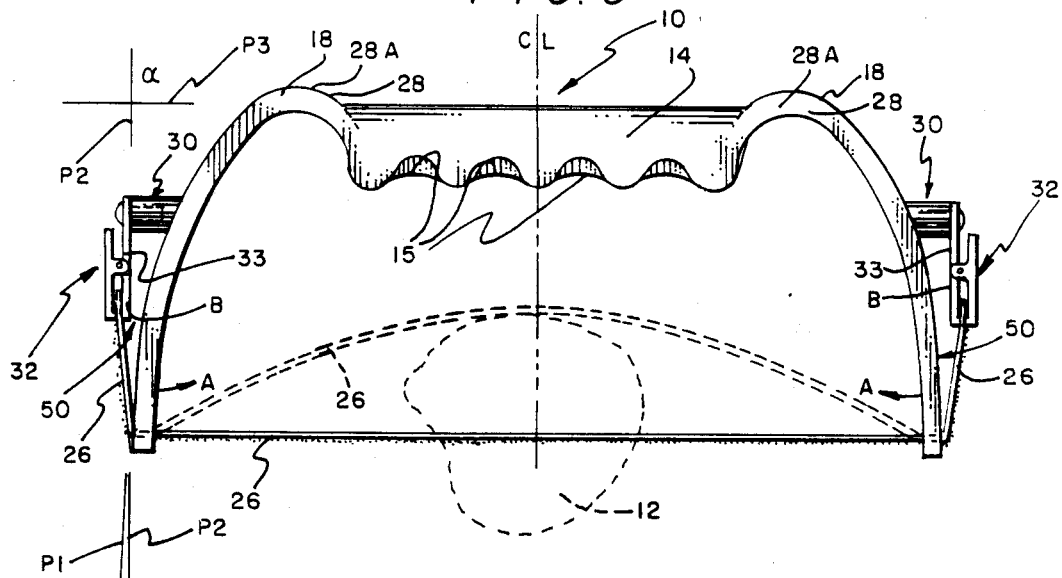
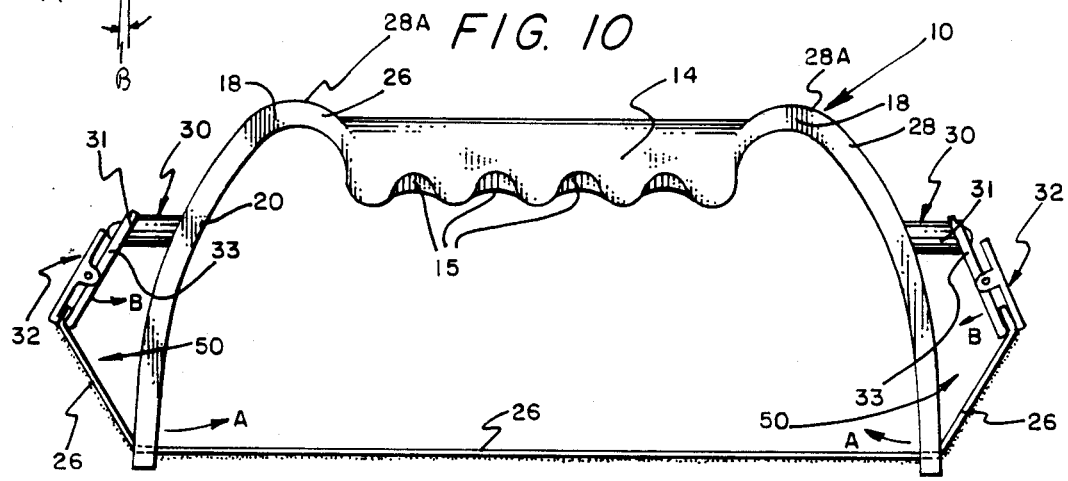
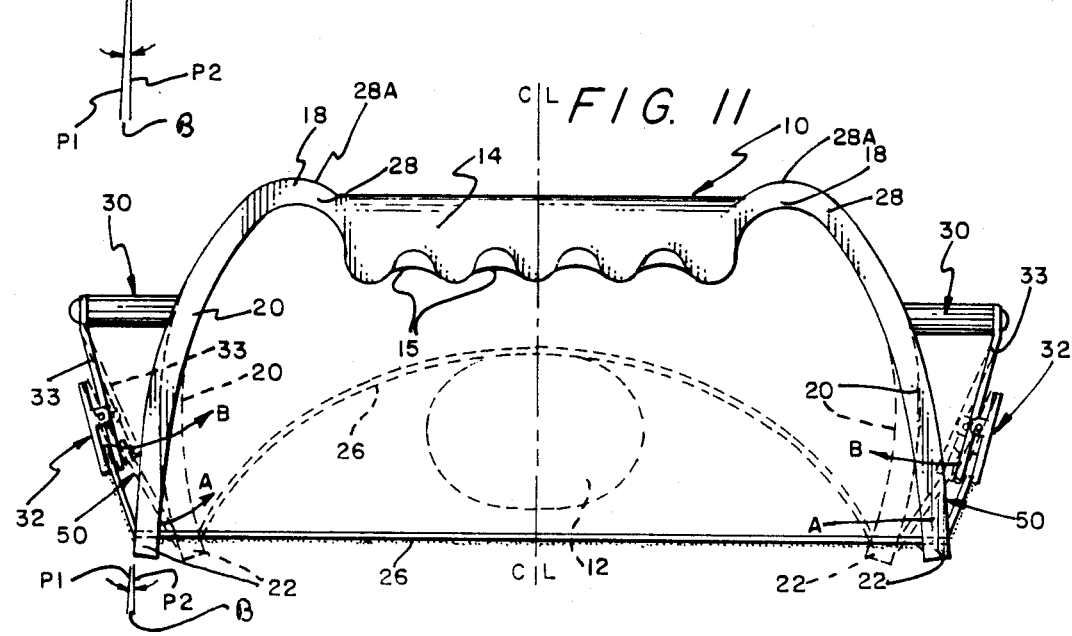

APPARATUS AND METHOD FOR MANUALLY SMOOTHING AND CLEANING CERAMIC ARTICLES

This a continuation-in-part application of copending application having Ser. No. 07/382,982, filed July 21, 1989.

BACKGROUND OF THE INVENTION

1. Field of the Invention

This invention relates to an apparatus for smoothing and cleaning molded ceramics. More specifically, this invention provides an apparatus and method for manually smoothing and cleaning semi-hardened ceramic articles, such as vases, cups, dolls, and the like.

2. Description of the Prior Art

A patentability investigation was conducted and the following U.S. Pat. Nos. were discovered: 2,132,889 to Ayres; 2,447,327 to Gerrits et al.; 4,314,426 to Friend; Des. 267,439 to Gibson; Des. 267,591 to Gibson; 4,694,618 to Eberhart et al.; 2,527,089 to Adams; 1,660,351 to Pataki; 2,529,434 to Walker; 4,071,983 to Thielen; 2,332,307 to Demms; 2,123,889 to Gleason; 2,446,653 to Kelly; and No. 3,874,126 to Catlin et al. None of the foregoing prior art patents teach or suggest the apparatus and method of this invention.

SUMMARY OF THE INVENTION

The present invention accomplishes its desired objects by broadly providing an apparatus for manually smoothing and cleaning ceramic articles comprising a generally elongated body of flexible material. The body has a pair of springable leg means with each leg means including a top portion, an intermediate portion, and a terminous portion having a structure defining a slot. A flexible fastening device (more specifically a shank of the flexible fastening device) is disposed on and connected to each of the intermediate portions, and each fastening device in addition to the shank has a pair of jaws with one of the jaws integrally bound or formed with the shank and spaced away from the intermediate portion to provide a zone between the flexible fastening device and the intermediate portion wherein the flexible fastening device, more specifically the pair of jaws, can flex or bend towards the intermediate portion. A flexible elongated abrasive pad passes through each of the slots and is attached to each of the fastening devices, more particularly the pair of jaws, such that the abrasive pad means is freely suspended between the terminous portion of each leg means in a generally taut condition. The fastening devices and the legs provide a means for springingly absorbing pressure applied to the pad when the pad is pressed into engagement with a ceramic article and a reciprocating smoothing and cleaning movement is applied. In another embodiment of the invention, each intermediate portion of each leg means includes a lug means secured to the outside surface of the intermediate portion and extending away therefrom, and a flexible fastening device is disposed on each of the lug means and is spaced away from the intermediate portion to provide a zone between the flexible fastening device and the intermediate portion wherein the flexible fastening device can flex or bend towards the intermediate portion.

The portion of the elongated abrasive pad between the terminous portions of the pair of leg means is generally perpendicular with respect to each of the terminous portions. The body additionally comprises a handle, and the handle is in spaced parallelism with the pad when the latter has not been pressed into engagement with the ceramic article. Each of the top portions terminates in the handle. A terminous plane along each of the terminous portions of each leg means forms an angle of from about 1 to about 10 degrees with a vertical plane, and a top plane through the center of each top portion forms an angle of from about 80 degrees to about 100 degrees with the vertical plane.

Each of the said top portions has a structure defining an arcuate bend which bends gradually up and away from the handle until reaching an apex and subsequently commences from the apex to bend gradually down and away to terminate in the intermediate portion. The handle has a structure defining a plurality of indentations. Each of the intermediate portions has a bow-like structure, and each of the fastening devices more specifically comprises an alligator clip having a shank and spring biased jaws for clamping the pad in a freely suspended position after passing through each of the slots. The spring biased jaws of each of the alligator clips extend towards the slot of the terminous portion and terminate thereabove such that after the pad passes through the slots, the pad extends in a direction towards the jaws along the outside of the terminous portion.

The present invention further accomplishes its desired objects by also broadly providing a method for manually smoothing and cleaning ceramic articles comprising the steps of:

(a) forming a generally flexible elongated body having a pair of springable leg means with each leg means including a top portion, an intermediate portion and a terminous portion having a structure defining a slot, and with each intermediate portion having a flexible fastening device secured thereto and in a spaced relationship from the intermediate portion such as to provide a zone between the flexible fastening device and the intermediate portion wherein the flexible fastening device can flex towards the intermediate portion;

(b) passing a flexible elongated abrasive pad means through each of the slots and subsequently attaching the pad means to each of the fastening devices such that the abrasive pad means is freely suspended between the terminous portion of each leg means in a generally taut condition;

(c) flexing each of the fastening devices towards their respective intermediate portion of the leg means by passing the pad into engagement with a ceramic article;

(d) flexing each of the terminous portions of the leg means towards the ceramic article by continually pressing the pad into engagement with the ceramic article; and (e) smoothing and cleaning the ceramic article by moving the abrasive pad in a reciprocating fashion against the ceramic article.

The method additionally comprises forming the abrasive pad means into a bow-like structure simultaneously with said flexing step (c).

It is therefore an object of the present invention to provide an apparatus and method for manually smoothing and cleaning ceramic articles.

These, together with the various ancillary objects and features which will become apparent to those skilled in the art as the following description proceeds, are attained by this novel apparatus and method, a preferred embodiment being shown with reference to the accompanying drawings, by way of example only, wherein:

BRIEF DESCRIPTION OF THE DRAWINGS

FIG. 9 is a front elevational view of yet another embodiment of the apparatus;

FIG. 10 is a front elevational view of a further embodiment of the apparatus;

FIG. 11 is a front elevational view of yet another embodiment of the apparatus;

DETAILED DESCRIPTION OF THE INVENTION

Figure 1:
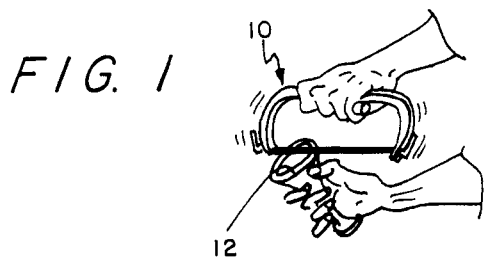
FIG. 1 is a perspective view of the apparatus for cleaning ceramic articles being held by a worker and engaged to a ceramic article.
Figure 2:
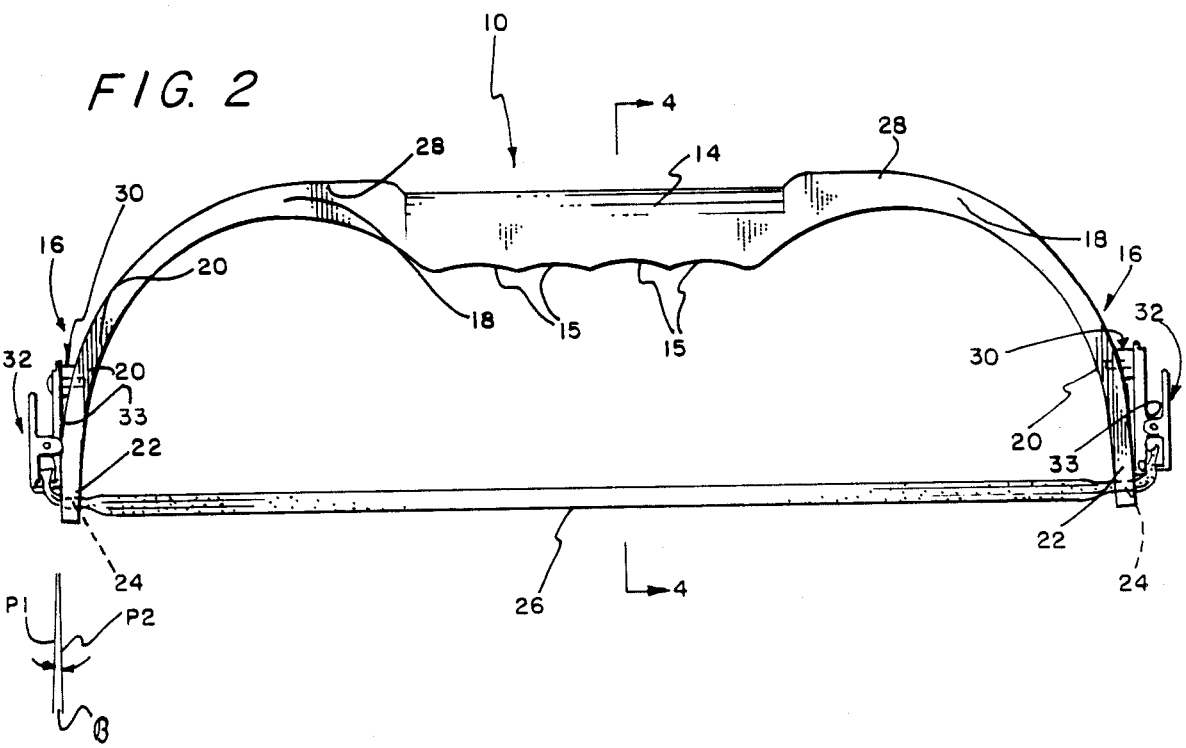
FIG. 2 is a front elevational view of the apparatus.
Figure 3:
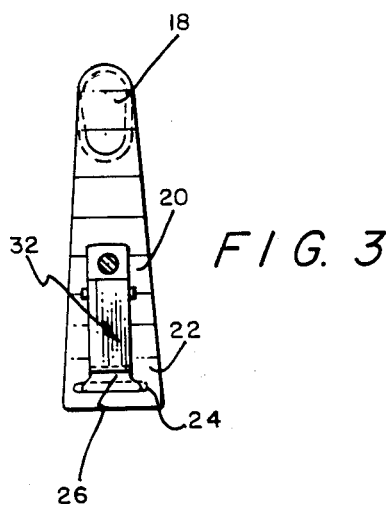
FIG. 3 is an end elevational view of the apparatus of FIG. 2.
Figure 4:
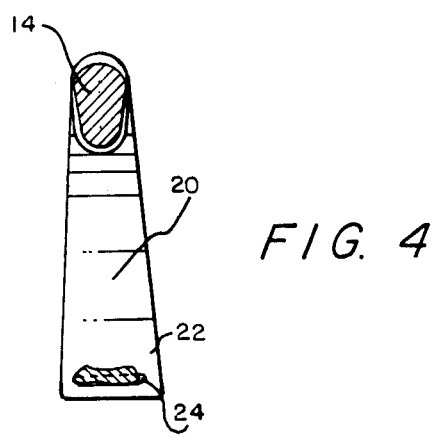
FIG. 4 is a vertical sectional view taken in direction of the arrows and along the plane of line 4—4 in FIG. 2.
Figure 5:
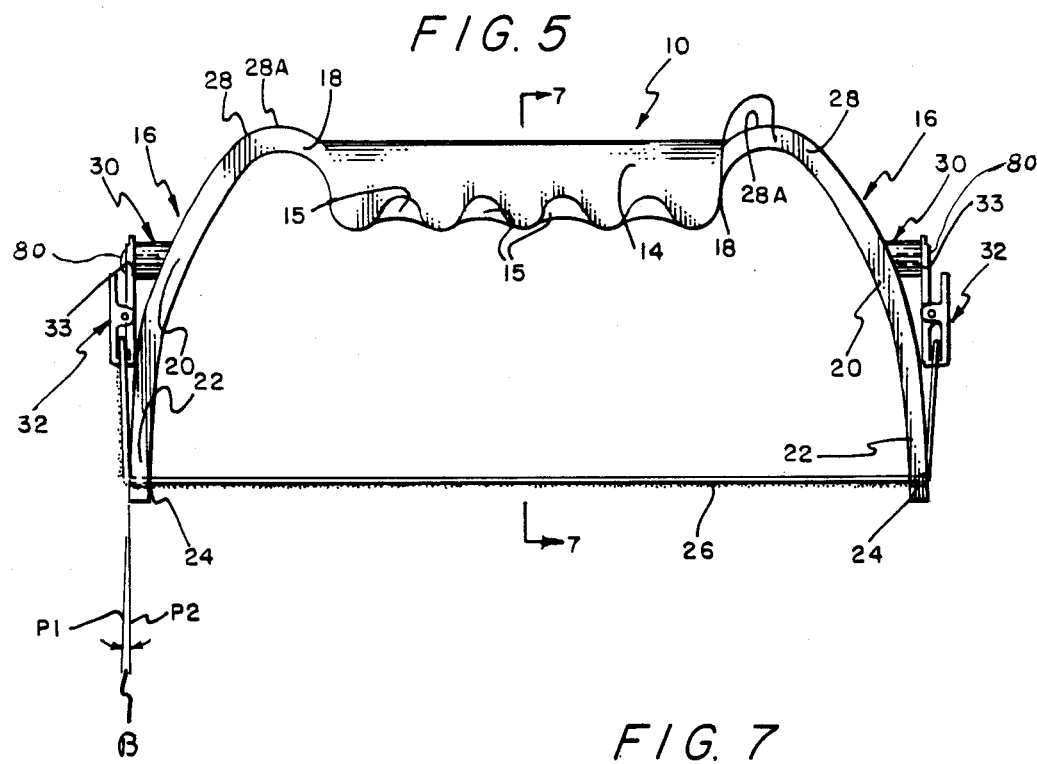
FIG. 5 is a front elevational view of another embodiment of the apparatus.
Figures 6, 7:
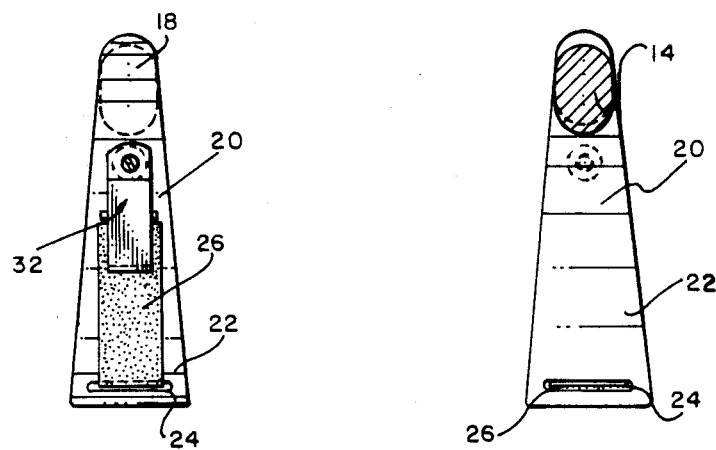
FIG. 6 is a side elevational view of the apparatus of FIG. 5.
FIG. 7 is a vertical sectional view taken in direction of the arrows and along the plane of line 7—7 in FIG. 5.
Figure 8:
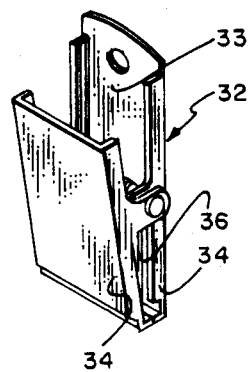
FIG. 8 is a perspective view of the alligator clip used to hold the abrasive pad.

Referring in detail now to the drawings wherein similar parts of the invention are identified by like reference numerals, there is seen the apparatus of the invention, generally illustrated as 10, which is for smoothing and cleaning of molded ceramic articles 12, such as, by way of example only, semihardened ceramic articles, greenware, earthenware, porcelain, china fired ceramicware, and the like. It is intended that whenever "ceramic articles" is termed herein, it is to mean within the spirit and scope of the present invention any of the immediate foregoing exemplaries, preferably semi-hardened ceramicware or greenware (after it has been removed from the mold and air dried), or china fired (cone 020/1175° F. to cone 015/1479° F.) ceramic that may be defined as ceramicware which when immersed in water after soft fire will not dissolve back into liquid clay (slip). The apparatus 10 with the aid of water or the like removes imperfections and seams at the soft fired stage. The ceramic articles 12 can also be cleaned at the soft fired stage by employing sandpaper or the like in the apparatus 10 on the dry ware. More specifically, imperfections remaining after firing the ware (or article 12) to a normal hard fire (cone 06/1830° F. to cone 09/2336° F.) can be removed by using various grades of sandpaper in the apparatus 10. Recapitulating and generalizing, in the manufacture of ceramic articles 12, such as vases, dolls, toys, and the like, the article 12 is often initially formed in a mold of soft material. After removing or release from the mold, the article 12 is allowed to partially harden (i.e., semi-harden) and is subsequently smoothed and cleaned with the apparatus 10 of this invention to remove mold seams or any rough spots (e.g. sharp corners), and is finally fired or sintered in a kiln or the like.

The apparatus 10 may be manufactured of any material (preferably flexible material such as spring wire, plastic, or the like) and comprises a handle 14 having channels or indentations 15 for receiving fingers; and a pair of legs, each generally illustrated as 16, integrally formed with the handle 14 and generally extending or proceeding downwardly therefrom.

Each leg 16 includes a top portion 18, an intermediate portion 20, and a distal or terminous portion 22 which is provided with a slot 24 wherethrough a flexible elongated abrasive pad 26 removably passes. Each terminous portion 22 is preferably flexible such that when the apparatus 10 is held in the hand and the abrasive pad 26 is rubbed against the ceramic article 12 for smoothing and cleaning, the terminous portions 22—22 biasingly, springingly move in direction of the arrows A—A and towards the center line (see FIG. 11 and FIG. 13) in an amount proportionate to, or an amount depending upon the extent of, pressure applied by the pad 26 against the article 12. In the unflexed posture, a plane P1 along each terminous portion 22 of each leg 16 preferably forms an angle $\beta$ of from about 1 degree to about 10 degrees (more preferably about 3 degrees) with a vertical or perpendicular plane P2.

Each of the top portions 18—18 of each leg 16 is formed with or defined by an arcuate bend 28 that terminates in the handle 14. A plane P3 through the center of the arcuate bend 28 forms an angle $\alpha$ (see FIG. 9) of from about 80 degrees to about 100 degrees (more preferably about 90 degrees) with the vertical or perpendicular plane P2. As illustrated in the drawings, the structure of each arcuate bend 28 bends gradually up and away from the handle 14 until reaching apex 28A and subsequently commences therefrom to bend gradually down and away from the apex 28A to terminate in the intermediate portion 20.

In the embodiment of the invention in FIGS. 1-11, each of the intermediate portions 20—20 is a bow-like structure formed with a lug means 30 secured integrally to the outside surface of the intermediate portion 20 and protruding away therefrom. In FIG. 10 the lug means 30 has a slanted or beveled surface 31. Each lug means 30 is imposed with a flexible alligator clip, generally illustrated as 32, that is connected thereto and functions to hold the ends of the abrasive pad 26. Each flexible alligator clip 32 has a shank 33 and a pair of jaws 34—34 with one of the jaws 34 formed integrally with the shank 33. The pair of jaws 34—34 are biased towards a closed position by a spring 36 for grasping the ends of the abrasive pad 26. The top part of the shank 33 is secured to the lug means 30 (such as with a bolt 80) such that the ends of the jaws 34—34 are above the slot 24 and spaced away from the intermediate portion 20 and/or the terminous portion 22 to provide flexing zone 50 and such that the clips 32—32 possess the capabilities for bending, flexing or springing in direction of the arrows B—B into the flexing zone 50 and towards the center line CL. In FIG. 11, shank 33 is formed with an arcuate or bow shape.

Figure 12:
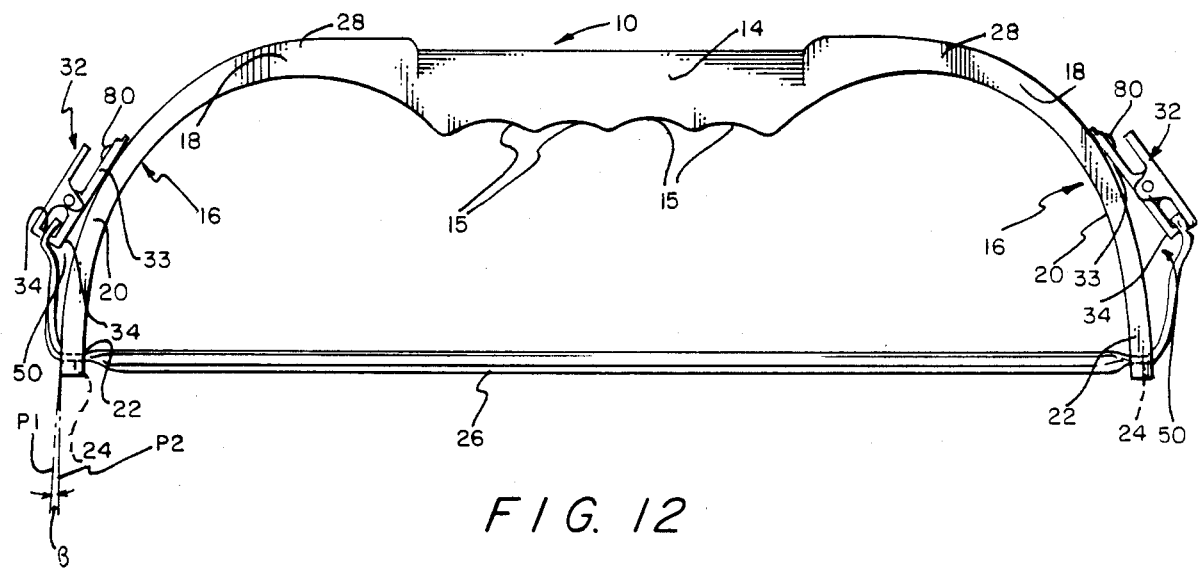
FIG. 12 is a front elevational view of another embodiment of the apparatus wherein the fastening device (more specifically a shank of a fastening device) connects directly to an intermediate portion of a leg.
Figure 13:
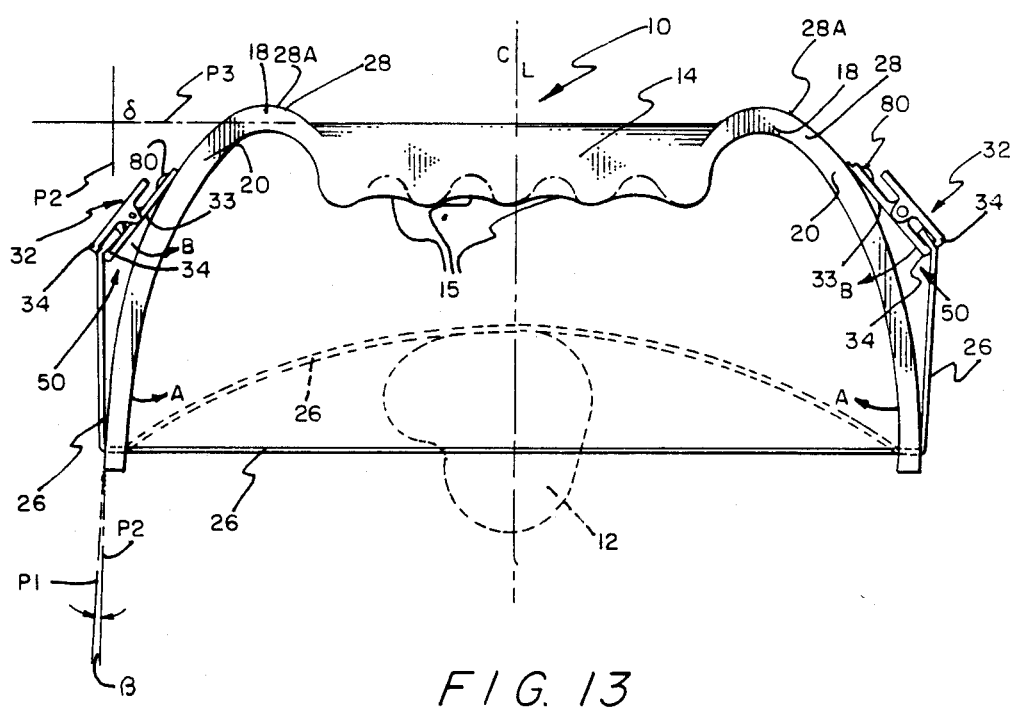
FIG. 13 is a front elevational view of the embodiment of the apparatus in FIG. 12 with the flexible elongated abrasive pad being bent against a ceramic article.

In the embodiment of the invention in FIGS. 12 and 13, each of the intermediate portions 20—20 is not formed with the lug means 30, and one of the flexible fastening devices or flexible alligator clips 32—32 connects directly to one of the intermediate portions 20—20. More specifically, the top part of the shank 33 is secured directly to the intermediate portion 20 with the bolt 80 such that the ends of the jaws 34—34 are above the slot 24 and spaced away from the intermediate portion 20 and/or the terminous portion 22 to provide the flexing zone 50; and such that the flexible fastening devices or flexible alligator clips 32—32 possess the capabilities for bending, flexing or springing in direction of the arrows B—B into the flexing zone 50. It is to be understood that whenever a flexible fastening device or flexible alligator clip 32 bends, flexes or springs, it is one of the jaws 34 and/or both jaws 34—34 and/or the shank 33 that does the bending, flexing or springing. Thus, bending, flexing or springing is not limited to any particular part or element of the flexible fastening device or flexible alligator clip 32.

When the apparatus 10 is held in the hand and the abrasive pad 26 is rubbed against the ceramic article 12 for smoothing and cleaning, not only do the terminous portions 22—22 springingly, flexibly move in direction of the arrows A—A towards the center line CL, but the flexible alligator clips 32 (more particularly the shank 33 and/or the jaws 34—34) also flex and bend towards the center line CL, in direction of the arrows B—B (see dotted line position of clip 32 in FIG. 11). As was seen for the terminous portions 22—22, the amount of bending or movement depends on the extent of pressure applied by pad 26 against the article 12. One of the salient points of the invention is that downward pressure applied on the pad 26 as it is rubbing or sliding against the ceramic article 12 for smoothing and cleaning, causes both the terminous ends 22—22 and the alligator clips 32—32 to flex or bend towards the center line CL and into the flexing zone 50.

The abrasive pad 26 may be made from any suitable material such as a nylon perforate material having a mesh size ranging from about 500 per square inch to about 1300 per square inch (preferably 900 mesh per square inch). For extra fine sanding (as for porcelain), nylon hose can be used. For coarser sanding, an abrasive pad, sandpaper or large mesh nylon tulle or nylon net can be used.

As previously indicated, the assembly of the apparatus 10 is adapted particularly for manually smoothing and cleaning of semi-hardened molded ceramic articles 12. The handle 14 of the apparatus 10 is grasped by a hand of a worker. The abrasive pad 26 is placed in contact with the part of the ceramic article 12 that is to be smoothed and cleaned manually. As the worker presses the apparatus 10 towards the ceramic article 12 to be smoothed and cleaned, the suspended pad 26 becomes deformed into a bow shape (see FIGS. 9 and 11 and 13) and the terminous portions 22—22 and the alligator clips 32—32 bend or flex in direction of the arrows A—A and B—B, respectively, and towards the center line CL. Stated alternatively and with further explanation, as the worker presses the apparatus 10 towards the ceramic article 12 and provides a back-and-forth reciprocated smoothing and cleaning movement, the pressure will cause the freely suspended pad 26 to deform inwardly into a bow-like configuration towards the handle 14. The deformation and continual pressure causes both the terminous portions 22—22 to flex in direction of the arrows A—A and towards the center line CL and the alligator clips 32—32 to flex in direction of the arrows B—B and towards the center line CL. The greater the pressure applied by the worker, the more bow-like becomes the deformation of the pad 26, and the further towards the center line CL will the terminous portions 22—22 and the alligator clips 32—32 flex and bend, in order to adjust and/or regulate the net pressure applied by the abrasive pad 26 against the part of the ceramic article 12 being manually smoothed and cleaned. When the pressure is totally released, the abrasive pad 26 deforms to its freely suspended position of FIGS. 1, 5 and 10 and the terminous portions 22—22 and the alligator clips 32—32 spring back to the then unflexed position.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for manually smoothing and cleaning ceramic articles comprising a generally elongated body flexible material, said body having a pair of springable leg means for holding a flexible elongated abrasive pad with each leg means including a top portion, an intermediate portion, and a terminous portion having a structure defining a slot; a flexible fastening device connected to each intermediate portion of each leg means and spaced away from the intermediate portion to provide a zone between the flexible fastening device and the intermediate portion wherein the flexible fastening device can bend towards the intermediate portion; a flexible elongated abrasive pad passing through each of the slots and attached to each of the fastening devices such that the abrasive pad is freely suspended between the terminous portion of each leg means in a generally taut condition; and said fastening devices and said legs providing a means for springingly absorbing pressure applied to the pad when the pad is pressed into engagement with a ceramic article and a reciprocating smoothing and cleaning movement is applied.

2. The apparatus of claim 1 wherein the portion of the elongated abrasive pad between the terminous portions of the pair of leg means is generally perpendicular with respect to each of the terminous portions.

3. The apparatus of claim 1 wherein said body additionally comprises a handle, said handle being in spaced parallelism with said pad when the latter has not been pressed into engagement with the ceramic article.

4. The apparatus of claim 3 wherein each of said top portions terminates in said handle.

5. The apparatus of claim 4 wherein each of said top portions has a structure defining an arcuate bend which bends gradually up and away from the handle until reaching an apex and subsequently commences from said apex to bend gradually down and away to terminate in the intermediate portion.

6. The apparatus of claim 4 wherein said handle has a structure defining a plurality of indentations.

7. The apparatus of claim 1 wherein a terminous plane along each of the terminous portion of each leg means forms an angle of from about 1 to about 10 degrees with a vertical plane.

8. The apparatus of claim 1 wherein a top plane through the center of each top portion forms an angle of from about 80 degrees to about 100 degrees with the vertical plane.

9. The apparatus of claim 1 wherein each of said intermediate portions has a bow-like structure.

10. The apparatus of claim 1 wherein each of said fastening devices comprises an alligator clip having spring biased jaws for clamping said pad in a freely suspended position after passing through each of said slots.

11. The apparatus of claim 10 wherein the spring biased jaws of each of said alligator clips extend towards the slot of the terminous portion and terminate thereabove such that after the pad passes through the slots the pad extends in a direction towards the jaws along the outside of the terminous portion.

12. The apparatus of claim 11 wherein said alligator clip comprises an arcuate shank.

13. The apparatus of claim 10 wherein said alligator clip comprises an arcuate shank.

14. An apparatus for manually smoothing and cleaning ceramic articles comprising a generally elongated body of flexible material, said body having a pair of springable leg means for holding a flexible elongated abrasive pad with each leg means including a top portion, an intermediate portion, and a terminous portion having a structure defining a slot; each intermediate portion of each leg means includes a lug means secured to an outside surface of said intermediate portion and extending away therefrom; a flexible fastening device disposed on each of the lug means and spaced away from the intermediate portion to provide a zone between the flexible fastening device and the intermediate portion wherein the flexible fastening device can bend towards the intermediate portion; a flexible elongated abrasive pad passing through each of the slots and attached to each of the fastening devices such that the abrasive pad is freely suspended between the terminous portion of each leg means in a generally taut condition; and said fastening devices and said legs providing a means for springingly absorbing pressure applied to the pad when the pad is pressed into engagement with a ceramic article and a reciprocating smoothing and cleaning movement is applied.

15. A method for manually smoothing and cleaning ceramic articles comprising the steps of:
(a) forming a generally flexible elongated body having a pair of springable leg means for holding a flexible elongated abrasive pad with each leg means including a top portion, an intermediate portion and a terminous portion having a structure defining a slot, and with each intermediate portion having a flexible fastening device secured thereto and in a spaced relationship from the intermediate portion such as to provide a zone between the flexible fastening device and the intermediate portion wherein the flexible fastening device can flex towards the intermediate portion;
(b) passing a flexible elongated abrasive pad through each of the slots and subsequently attaching the pad to each of the fastening devices such that the abrasive pad is freely suspended between the terminous portion of each leg means in a generally taut condition;
(c) flexing each of the fastening devices towards their respective intermediate portion of the leg means by passing the pad into engagement with a ceramic article;
(d) flexing each of the terminous portions of the leg means towards the ceramic article by continually pressing the pad into engagement with the ceramic article; and
(e) smoothing and cleaning the ceramic article by moving the abrasive pad in a reciprocating fashion against the ceramic article.

16. The method of claim 15 additionally comprising forming the abrasive pad into a bow-like structure simultaneously with said flexing step (c).

17. A method for manually smoothing and cleaning ceramic articles comprising the steps of:
(a) forming a generally flexible elongated body having a pair of springable leg means with each leg means including a top portion, an intermediate portion and a terminous portion having a structure defining a slot, and with each intermediate portion having a lug means whereto a flexible fastening device is secured in a spaced relationship from the intermediate portion such as to provide a zone between the flexible fastening device and the intermediate portion wherein the flexible fastening device can flex towards the intermediate portion;
(b) passing a flexible elongated abrasive pad means through each of the slots and subsequently attaching the pad means to each of the fastening devices such that the abrasive pad means is freely suspended between the terminous portion of each leg means in a generally taut position;
(c) flexing each of the fastening devices towards their respective intermediate portion of the leg means by passing the pad into engagement with a ceramic article;
(d) flexing each of the terminous portions of the leg means towards the ceramic article by continually pressing the pad into engagement with the ceramic article; and
(e) smoothing and cleaning the ceramic article by moving the abrasive pad in a reciprocating fashion against the ceramic article.

18. The method of claim 17 additionally comprising forming the abrasive pad into a bow-like structure simultaneously with flexing step (c).

* * * * *